(12) United States Patent
McCormack et al.

(10) Patent No.: US 6,621,657 B1
(45) Date of Patent: Sep. 16, 2003

(54) TAPE DRIVE CARTRIDGE LATCHING MECHANISM

(75) Inventors: Patrick H. McCormack, Costa Mesa, CA (US); Robert R. Heinze, San Clemente, CA (US); Anthony T. Robertson, Tustin, CA (US)

(73) Assignee: Seagate Removable Storage Solutions LLC, Scotts Valley, CA (US)

( * ) Notice: Subject to any disclaimer, the term of this patent is extended or adjusted under 35 U.S.C. 154(b) by 0 days.

(21) Appl. No.: 10/026,546

(22) Filed: Dec. 27, 2001

Related U.S. Application Data
(60) Provisional application No. 60/260,605, filed on Jan. 8, 2001.

(51) Int. Cl.$^7$ .............................................. G11B 15/68
(52) U.S. Cl. ................................................... 360/96.5
(58) Field of Search ........................... 360/96.5, 96.2; 242/346.2, 338.4, 326.1

(56) References Cited

U.S. PATENT DOCUMENTS

| | | | |
|---|---|---|---|
| 6,128,158 A | * 10/2000 | Saito et al. | 360/96.5 |
| 6,141,180 A | * 10/2000 | Smith | 360/96.5 |
| 6,392,836 B1 | 5/2002 | Kim | 360/96.5 |
| 6,392,837 B1 | 5/2002 | Kim | 360/96.5 |
| 6,473,262 B1 | 10/2002 | Kim | 360/96.5 |
| 6,515,823 B2 | 2/2003 | Kim | 360/96.5 |

* cited by examiner

Primary Examiner—David Davis
(74) Attorney, Agent, or Firm—McDermott, Will & Emery

(57) ABSTRACT

In an automatic tape loader mechanism, for example for a digital tape storage system, the forces of registration springs intended to engage notches in a tape cartridge are de-rated prior to and/or during insertion of a tape cartridge into the loader. The preferred embodiment utilizes two registration springs mounted on a cartridge shuttle. When the shuttle is in its initial position for loading and unloading of the cartridge, the distal end of each spring engages a ramp formed on the support of the loader housing. This engagement deflects the springs away from the cartridge and thereby reduces the force necessary to insert the cartridge. To reduce scraping, the springs preferably carry rollers to engage the walls and registration notches of the cartridge.

16 Claims, 9 Drawing Sheets

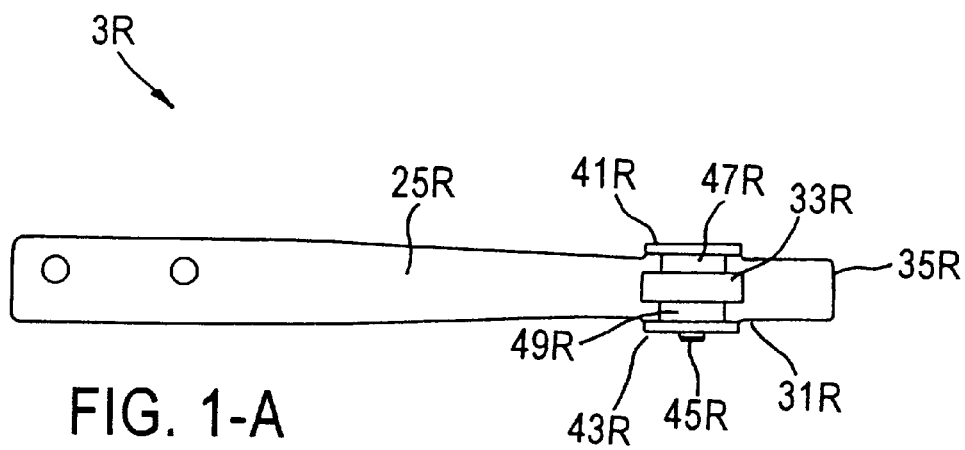
FIG. 1-A
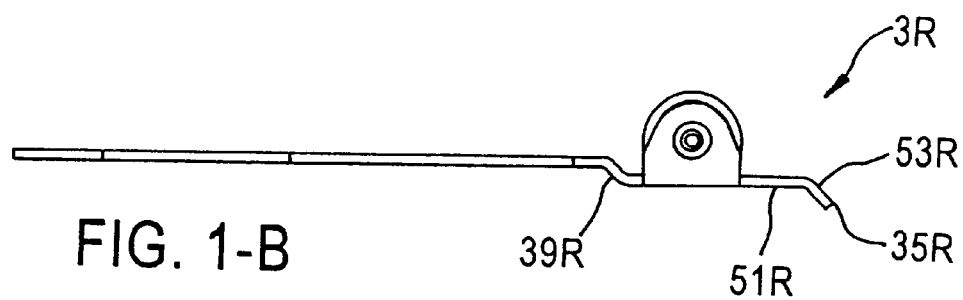
FIG. 1-B
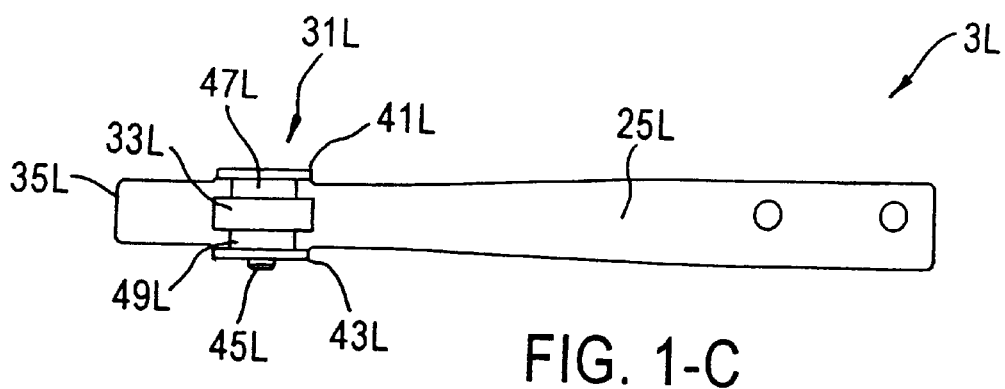
FIG. 1-C
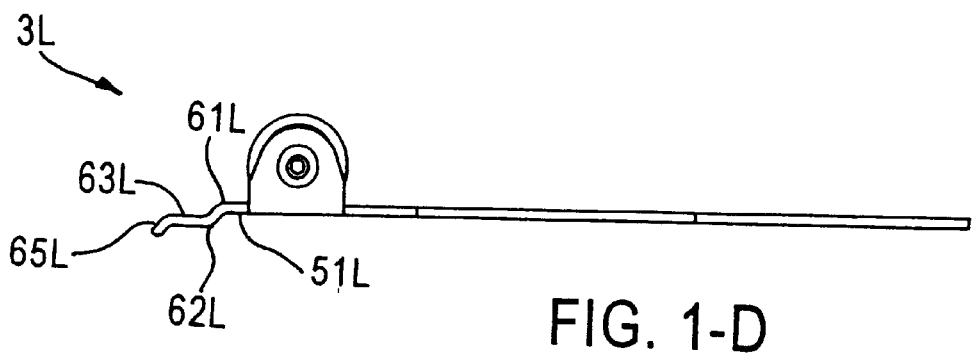
FIG. 1-D

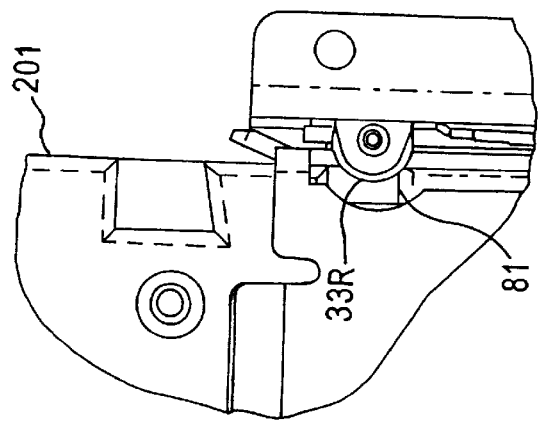
FIG. 6-C
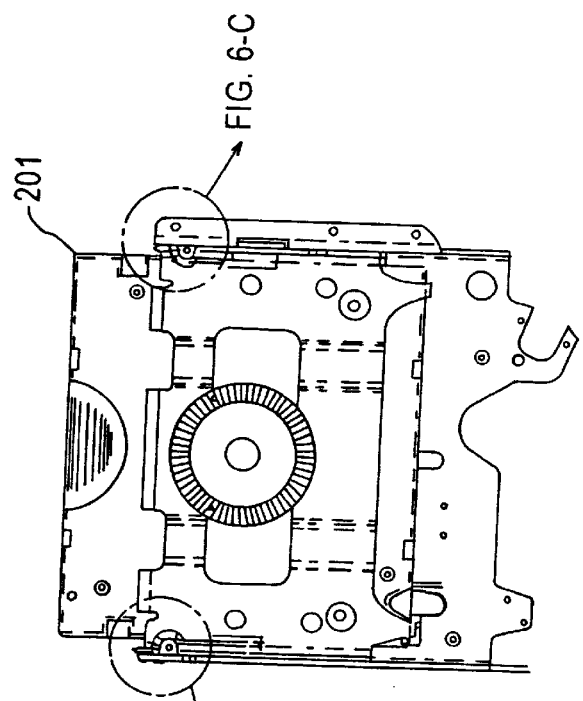
FIG. 6-A
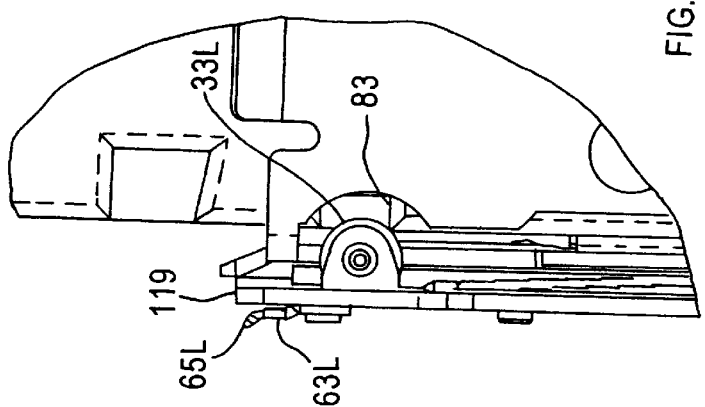
FIG. 6-B

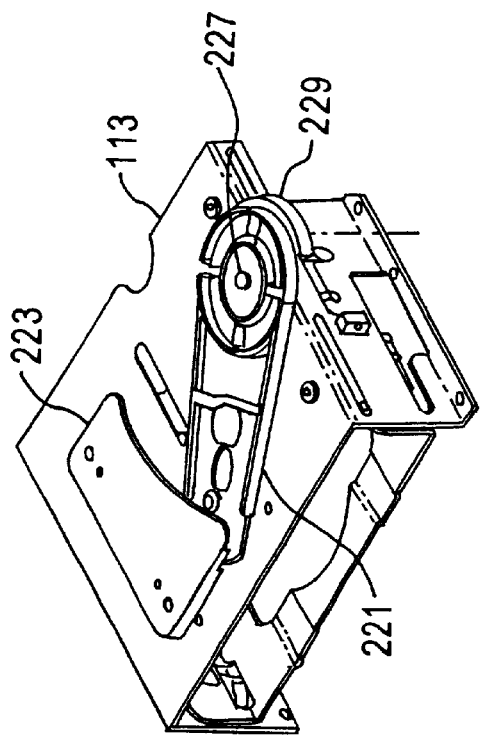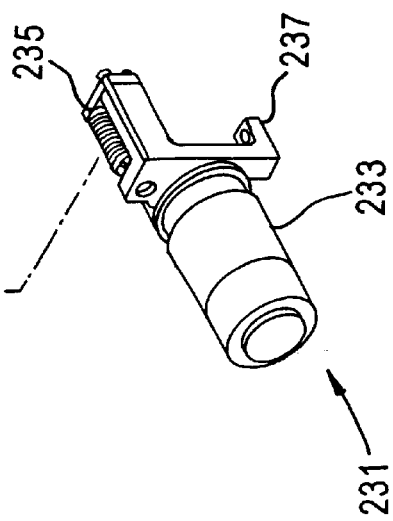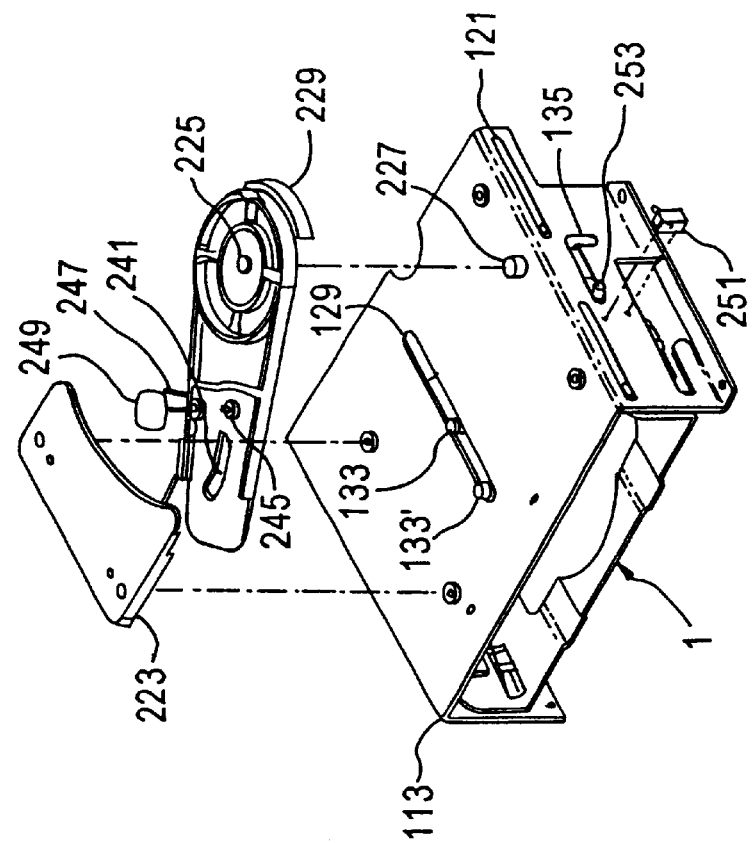

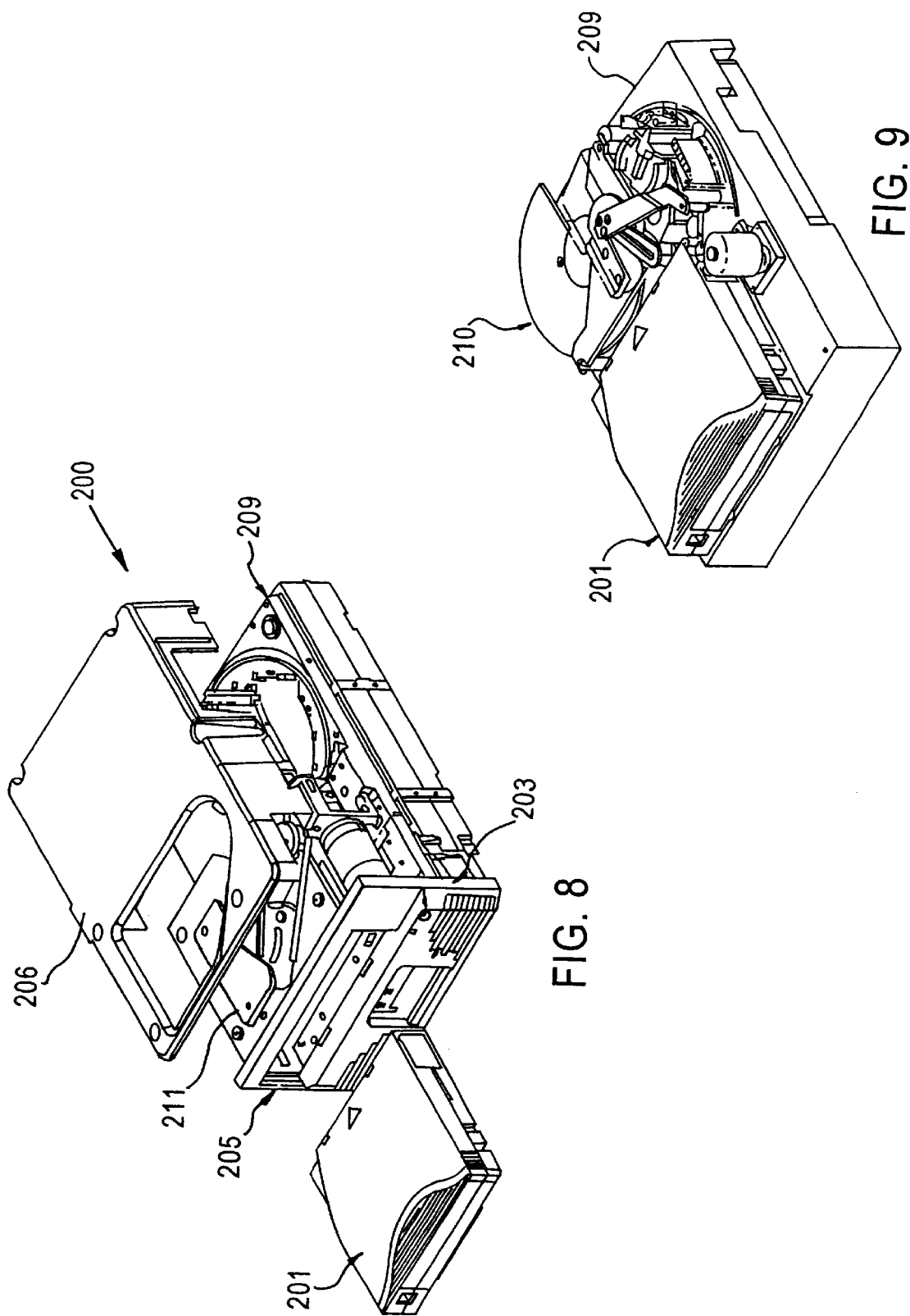

TAPE DRIVE CARTRIDGE LATCHING MECHANISM

RELATED APPLICATION

This application claims the benefit of U.S. Provisional Application No. 60/260,605 entitled "TAPE DRIVE CARTRIDGE LATCHING MECHANISM" filed on Jan. 8, 2001, the disclosure of which is entirely incorporated herein by reference.

FIELD OF THE INVENTION

The invention relates to the use of one or more spring assemblies, for example leaf springs with rollers, which engage notches in the tape cartridge, when the cartridge is fully inserted into the cartridge shuttle of an automatic loader mechanism. The spring(s) and the associated housing are designed to de-rate the spring force and thereby minimize the force on the cartridge during insertion and removal and to reduce friction and scraping of the cartridge during such operations.

BACKGROUND

Computers utilize a variety of magnetic media devices for the storage of software programs and data. Information recorded on the magnetic medium takes the form of flux transitions that represent the binary "1's" and "0's" that form the digital information. Tape cartridges, such as single-reel tape cartridges, are commonly used in library or other archival data storage applications. In such applications, a user or a robotic mechanism selects a tape cartridge for processing and inserts the cartridge into a tape drive coupled to a computer. In a fully automated system, a mechanism within the tape drive loads the tape from its entry point to a position in which the tape becomes accessible for read-from and write-to operations.

A variety of different size data tape cartridges are available. The drives for the different size cartridges, however, must be substantially the same size, so as to fit within a standard size slot or space available within the framework of a personal computer or the like. Larger cartridges enable storage of more data on the tape within, however, the larger the cartridge the more difficult it is to design a drive mechanism to fit within the design envelope.

For example, some single reel cartridges are 105.4 mm wide, by 102 mm long by 21.5 mm high. Such a cartridge, by itself fills a substantial portion of the design envelope for the tape drive. As a result, tape drives for this type of cartridge have utilized manual loading mechanisms. All movement and operations to load the tape cartridge into the drive, open the tape door for access to the tape leader and engage the tape drive gear to the drive motor gear have been manual in nature. A portion of the cartridge remains outside the drive, even in the fully loaded position.

Hence, a general need exists for an automatic loading mechanism for data tape cartridges that takes up the minimum amount of space within the design envelope of the tape drive, to allow the mechanism and the drive to handle as large a cartridge as possible. Also, a need exists for a loader mechanism of this type that is particularly durable and can operate successfully for a large number of loading/unloading cycles without any jams or other failures.

RELATED DEVELOPMENT WORK

Applicants and/or coworkers at the assignee of the present case have developed a fully automated tape cartridge loader system specifically designed for high durability in extended usage yet configured so that the elements thereof occupy minimal space and thereby meet the above-stated general need.

This tape cartridge loader includes a moveable shuttle, for receiving the tape cartridge and moving to and from a position within the system in which the cartridge is operatively loaded into the tape drive. The shuttle motion is bidirectional, typically front-to-back and top-down during loading. The loader also includes a conveyor, which is mounted for linear motion. The conveyor, however, supports the shuttle in such a manner that linear motion of the convey produces the desired two-dimensional motion of the shuttle and the cartridge.

For example, the conveyor has two sidewalls and one or more cam profiles in each sidewall. Corresponding cam follower bearings are attached to the sides of the shuttle for engagement with the respective cam profiles. The loader includes a substantially flat, rotatable actuator arm. The arm includes a groove, the edges of which serve as cam profiles. These later profiles drive a bearing attached to the conveyor, to move the conveyor along a linear path during loading and unloading operations. As the arm induces the linear movement of the conveyor, the conveyor interacts through the follower bearings and the cam profiles on its sides, to produce the necessary bidirectional movements of the shuttle during loading and unloading operations.

The initial design of this loader mechanism is disclosed for example in copending U.S. application Ser. No. 09/314,970 filed May 20, 1999 entitled "TAPE CARTRIDGE-LOADING MECHANISM" (50103-224) and in copending U.S. application Ser. No. 09/314,974 filed May 20, 1999 entitled "TECHNIQUES FOR COMPENSATING FOR HIGH INITIAL UNLOADING FORCE REQUIREMENT IN TAPE CARTRIDGE-LOADING MECHANISM" (50103-223), the disclosures of which are entirely incorporated herein by reference.

Of note for purposes of discussion here, the initial version of the loader system included springs on the shuttle for registration with notches in the lower side edges of the tape cartridge. Specifically, near the lower front corner, each sidewall of the shuttle included a rectangular opening, which extended somewhat into the bottom plate. A flat leaf spring was riveted to each shuttle sidewall so that a distal end thereof extended through one of the openings into the interior of the cartridge shuttle assembly. When a cartridge was fully inserted into the shuttle, the springs engaged the notches in the tape cartridge to secure the cartridge within the shuttle during the loading and unloading movements of the shuttle.

The insertion and removal forces on the cartridge, particularly for certain tape library applications, need to be fairly low. The registration spring design discussed above created excessive forces resisting insertion and removal of the cartridge, for example requiring too much force for some types of robotic arm intended to select and move cartridges to and from the loader itself. Additionally, friction of the springs with the sides of the cartridge caused extreme wear on the cartridge. Furthermore, the attendant scraping created debris, which could potentially contaminate the tape path.

Hence there is an additional need for a registration mechanism for a tape cartridge loader, wherein the forces caused by the registration mechanism are minimal during cartridge insertion into and removal from the loader, and that reduces or eliminates the debris otherwise generated by scraping of the cartridge by the springs. The registration mechanism, however, must still provide ample registration force to secure the cartridge within the shuttle during the loading and unloading movements of the shuttle.

SUMMARY OF THE INVENTION

The inventive concepts alleviate the above noted problems with registration systems of tape cartridge loader mechanisms and thereby meet the stated needs. For example, the invention involves de-rating the force applied by one or more registration springs prior to and/or during insertion of a tape cartridge into the loader. However, when the cartridge is fully inserted in the loader and then moved away from the initial loading position, the de-rating stops, and the spring(s) apply the full force to the registration notch(es), to insure stable transport of the cartridge to and from actual engagement with the associated tape drive. An aspect of the preferred embodiment involves reducing friction and scraping force on the cartridge by utilizing a roller near the end of the registration spring to actually contact the surface of the cartridge.

Hence one aspect of the invention relates to an automatic tape cartridge loader. The loader includes a mechanism for receiving the tape cartridge and automatically moving the cartridge between an initial position and an operative position. The initial position, for example, enables insertion and extraction of a cartridge from the loader. In the operative position, the cartridge is in engagement with a data tape drive serviced by the automatic tape cartridge loader. The loader also includes means for latching the tape cartridge within the loader mechanism with a de-rated registration force at the initial position and with a full registration force as the loader mechanism moves the cartridge to or from the operative position.

The preferred embodiment utilizes two leaf springs, one mounted on each side of the cartridge shuttle to engage a respective side of the cartridge. The de-rating of the springs is achieved by causing an extension at the distal end of each spring to engage a ramp, formed on the support of the loader housing, as the shuttle returns to its initial position for loading and unloading of the cartridge. The engagement with the ramp deflects the spring outward away from the cartridge, an amount sufficient to reduce the inward force that the spring applies to the cartridge. However, the retraction is not so complete as to avoid contact or eliminate the spring force on the cartridge completely. In this way, the force necessary to insert the cartridge is reduced, the springs still create a force and some minimal resistance to cartridge insertion.

Movement of the shuttle away from the initial position causes the extension to slip off of the ramp. The spring then applies its full force to the registration notch of the cartridge. In the preferred embodiment a roller bearing mounted on the spring serves as the actual registration device for contacting the side of the cartridge and engaging the notch.

Another aspect of the invention relates to a tape cartridge latching mechanism, for an automatic tape cartridge loader. The latching mechanism comprises a spring attached to the cartridge shuttle and a registration device coupled to the spring for engaging a registration notch on the tape cartridge with a force applied by the spring. The loader includes a fixed feature adapted to engage a portion of the spring when the cartridge shuttle is in the initial position. This engagement retracts the spring and thereby de-rates the force applied by the spring during insertion and removal of the tape cartridge. The location of the feature is such that the feature does not engage the spring, when the cartridge shuttle is moved away from the initial position.

In the preferred embodiment, the loader includes a frame housing and a conveyor mounted for linear motion within the frame housing. A cam and follower arrangement mounts the cartridge shuttle within the conveyor, in such a manner that the linear movement of the conveyor causes a bi-directional movement of the cartridge shuttle within the frame housing. A drive motor rotates an actuator arm to cause the linear movement of the conveyor, which causes the bi-directional movement of the cartridge shuttle. The movement of the shuttle transports the cartridge between an initial loading/unloading position and a loaded position in which the cartridge within the shuttle engages the digital tape drive.

Additional objects, advantages and novel features of the invention will be set forth in part in the description which follows, and in part will become apparent to those skilled in the art upon examination of the following and the accompanying drawings or may be learned by practice of the invention. The objects and advantages of the invention may be realized and attained by means of the instrumentalities and combinations particularly pointed out in the appended claims.

BRIEF DESCRIPTION OF THE DRAWINGS

The drawing figures depict preferred embodiments of the present invention by way of example, not by way of limitations. In the figures, like reference numerals refer to the same or similar elements.

FIGS. 1-A to 1-D are detailed views of the left and right latching spring assemblies used in the cartridge shuttle of FIG. 1.

FIG. 6-A is a bottom view of the elements of the loader from FIG. 3 shown in the assembled condition, with a cartridge inserted into the shuttle, and FIGS. 6-B and 6-C are break-out detail views of the inventive cartridge latching spring assemblies.

FIG. 7-A is an isometric view of the loader assembly with the shuttle conveyor actuator, from the front (cartridge loading) side.

FIG. 7-B is an exploded isometric view of the loader assembly and the shuttle conveyor actuator from the front (cartridge loading) side.

FIG. 7-C is an isometric view of the cartridge loading motor and worm gear assembly.

FIG. 8 is an isometric view of a tape cartridge and a tape drive, which incorporates a loader mechanism with the latching mechanism of the present invention.

FIG. 9 is an isometric view of the tape cartridge and the actual tape drive elements, showing the cartridge in the fully loaded position, albeit with the elements of the loader mechanism removed for ease of illustration.

DETAILED DESCRIPTION OF THE PREFERRED EMBODIMENTS

The various aspects of the invention disclosed herein relate to a technique for tailoring the forces applied by registration springs on the panels and/or edges of a tape cartridge as the cartridge is inserted or extracted from the shuttle of an automatic tape loader mechanism. Specifically, aspects of the invention involve de-rating the spring forces, when the shuttle is in its proper position for insertion or extraction of the cartridge. The preferred embodiment also utilizes rollers as the actual registration devices for contacting the cartridge, to thereby reduce scraping. The inventive cartridge latching mechanism may be used in a variety of different types of loader systems. However, the latching mechanism is particularly useful in the automatic tape cartridge loader system developed by Applicants and/or their coworkers, and the description of the preferred embodiments relates to a specific implementation in that preferred tape cartridge loader system.

The tape drive with the loader mechanism may be orientated in any convenient direction. For purposes of discussion, it is assumed that the opening for insertion of the tape cartridge corresponds to the "front" of the drive, and the width of the opening to receive the cartridge would be horizontal (see e.g., FIG. 8). The user would insert the cartridge with a front-to-back motion. In several of the drawings, the components of the loader mechanism and/or the tape drive are shown in a position to receive the cartridge from the front, and the loader mechanism retracts and lowers the cartridge during loading, to engage the tape within the drive. For convenience of discussion, references to horizontal, vertical, various sides and front and back will assume such a normal orientation of the drive and loader, and where appropriate to a corresponding orientation of the cartridge, as shown in those drawings. The orientations shown and the descriptive references thereto, however, are for purposes of illustration and example only.

Figure 1:
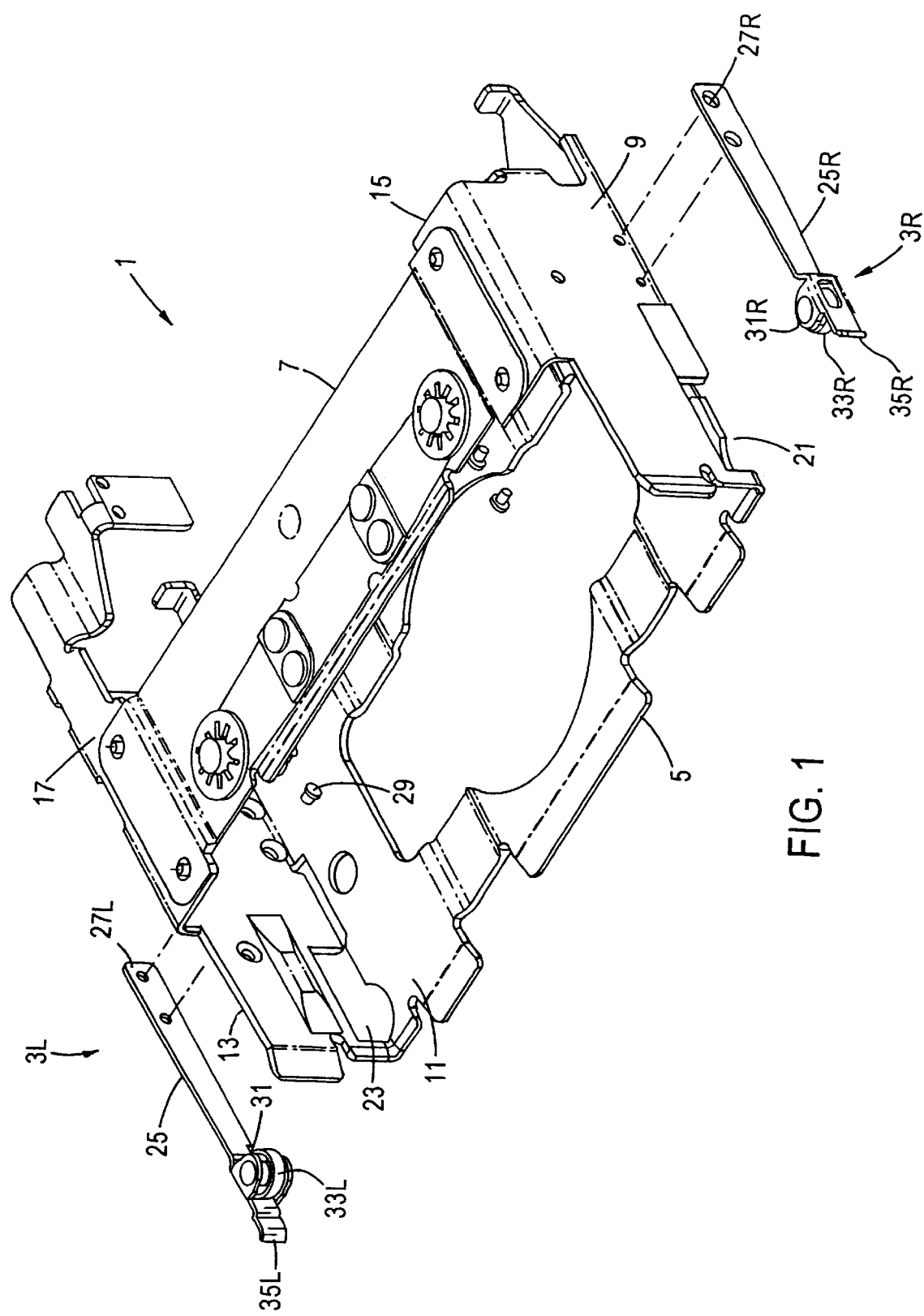
FIG. 1 is an Isometric view of a cartridge shuttle, with the inventive cartridge latching spring assemblies shown in exploded fashion.

Reference now is made in detail to the presently preferred embodiments of the invention, examples of which are illustrated in the accompanying drawings and discussed below. FIG. 1 illustrates the shuttle assembly 1 for a cartridge loader system of the preferred embodiment, with the elements of two latching mechanisms 3 shown in somewhat exploded form. The two latching mechanisms 3 are generally similar in structure, but as discussed more below, there are some differences in the preferred embodiments between the right latching mechanism 3R and the left latching mechanism 3L.

The shuttle assembly 1 essentially comprises two major components connected together to form a rectangular space sized to receive a tape cartridge. The first component is a roughly U-shaped shuttle member 5. The second component of the assembly 1 is a flat spring assembly 7.

The shuttle member 5 comprises a right sidewall 9, a planar bottom plate 11 and a left sidewall 13. The sidewalls 11, 13 are substantially perpendicular to and extend vertically upward from the bottom plate 11. Each sidewall 11, 13 connects to an attachment plate 15, 17, which is essentially an extension of the respective sidewall bent back at right angles to the sidewalls, and thus toward the top-center section of the shuttle assembly 1. Each of the attachment plates 15, 17 includes holes for receiving rivets, to secure the flat spring assembly 7 across the top of the cartridge shuttle member 5.

The flat spring assembly 7 comprises a plate for actual attachment of the spring assembly 7 to the plates 15, 17 associated with the sidewalls of the cartridge shuttle member 5. The plate in turn supports one or more cantilevered springs for applying downward spring pressure to the cartridge, to assist in engaging the tape reel of the cartridge with the tape chuck of the drive motor and to buffer the cartridge vertically within the shuttle.

Near the lower front corner, the sidewall 9 includes an opening 21, which extends somewhat into the bottom plate 11. The portion formed through the sidewall is substantially rectangular. The portion of the opening 21 formed through the bottom plate 11 is contoured to provide desired spacing for certain elements of the spring assembly 3R. The left sidewall 13 includes as similar opening 23. The openings 21, 23 enable mounting of spring assemblies 3 and extension thereof into the interior of the cartridge shuttle assembly 1.

The latching spring assemblies or mechanisms 3 may be identical. In the illustrated embodiment, the two latching spring assemblies 3R and 3L are substantially mirror images of each other. However, because of space constraints within the design envelope of the loader mechanism, the ramp engagement members used to de-rate the spring forces in the preferred embodiment are somewhat different.

As shown in FIG. 1, each spring assembly 3R, 3L comprises leaf spring 25R or 25L, which is essentially a long flat member formed of an appropriate spring material. Although other materials may be used, the presently preferred embodiment uses springs formed of stainless steel. The proximal end of each 1a includes two rivet holes 27L or 27R Each rivet hole 27R or 27L engages a rivet 29 (only one of which is visible in the drawing). The rivet passes through the hole 27 and through a matching hole in the respective sidewall 9 or 13 and thereby secures the leaf spring 25 to the sidewall. In this manner, the proximal end of each leaf spring 25R or 25L is secured to the respective sidewall 9 or 13, while the middle section and the distal end of each leaf spring are free to bend and move in relation to the shuttle member 5.

Each spring 25 supports a structure or assembly for registration with notches in the tape cartridge. The registration device on either spring 25 could be as simple as an appropriate bend in the spring itself or some form of button extending from the flat spring inward toward the center of the loader mechanism or cartridge. To reduce friction during insertion and removal, the preferred embodiment of the registration device comprises a cylindrical roller, such as a roller bearing.

Hence, in the illustrated embodiment, approximately three-fourths of the way from the proximal end toward the distal end, the metal forming each leaf spring 25R, 25L is bent to form a bearing support structure 31R or 31L. The structure 31R or 31L in turn supports a bearing assembly with a roller 33R or 33L, for engaging the cartridge through the opening 21 or 23 and registration in the notches of the cartridge when fully inserted.

In accord with the invention, each leaf spring supports or includes a retractor, preferably at the distal end of each spring. The retractor engages a fixed feature on the housing so as to retract the respective spring, as the shuttle moves into and stops at the initial position. The preferred embodiment of the fixed feature is a ramp formed on a sidewall of the housing of the loader mechanism. Hence, the preferred embodiment of the retractor on the spring is a ramp engagement member.

For that purpose, the actual distal end of each leaf spring 25R, 25L is bent to form a ramp engagement member 35R or 35L, in the illustrated embodiment. These members 35 may be similar on each spring 25. In the preferred embodiment, however, the contours of the members 35R and 35L differ because of differences in the amounts of available space on respective sides of the loader mechanism.

FIG. 1-A provides a bearing-side view of the right latching spring assembly 3R. FIG. 1-B provides a bottom view of the right latching spring assembly 3R.

As shown in FIG. 1-B, the spring 25R is bent back at 39R to provide a slight offset for the bearing support structure 31R. The bearing support structure 31R essentially comprises an upper plate 41R and a lower plate 43R. These plates are extensions of the spring 25R bent inward at substantially right angles, to thereby form an integral mounting structure for the roller.

The upper plate 41R has a counter-sunk borehole for receiving the head of a bearing shaft. The lower plate 43R has a straight-sided borehole for receiving the end of the bearing shaft, which is deformed over that borehole and a portion of the surface of the lower plate 43R, so as to form a rivet head 45R. The rivet head 45R retains the bearing shaft within the bearing support structure 31R, in a substantially vertical orientation. When so mounted, the shaft supports a roller bearing 33R between an upper spacer 47R and a lower spacer 49R. In the presently preferred embodiment, each roller 33 comprises a ball bearing of appropriate diameter mounted on the shaft between the spacers.

The dimensions of the support plates 41R, 43R and the roller bearing 33R are such that the axis of the bearing 33R is offset from the plane of the bent spring 25R in the region of the bearing support structure 31R by an amount less than the radius of the roller bearing 33R. The back of the spring 25R therefore has an opening to allow the bearing to rotate freely without rubbing against the spring 25R (see FIG. 1).

For the right latch spring assembly 3R, the ramp engagement member 35R comprises a flat extension 51R of the spring 25R, which extends toward the distal end of the spring from the vicinity of the bearing support structure 31 R (see FIG. 1-B). The ramp engagement member 35R also includes a section 53R, at the end of the flat extension 51R, which is bent back and extends outward at approximately a 45° angle.

FIG. 1-C provides a bearing-side view of the left latching spring assembly 3L. FIG. 1-D provides a bottom view of the left latching spring assembly 3L.

As shown in FIG. 1-D, the spring 25L is substantially flat from its proximal end out past the bearing support structure 31L. Hence, the spring 25L in this embodiment does not include a bend comparable to the bend 39R in the spring 25R (compare FIG. 1-D to FIG. 1B). Like the assembly 3R, the left spring 3L includes a bearing support structure 3 IL essentially comprising an upper plate 41L and a lower plate 43L. These plates 41L, 43L are extensions of the spring 25L bent inward at substantially right angles, to thereby form an integral mounting structure for the roller.

The upper plate 41L has a counter-sunk borehole for receiving the head of a bearing shaft. The lower plate 43L has a straight-sided borehole for receiving the end of the bearing shaft, which is deformed over that borehole and a portion of the surface of the lower plate 43L, so as to form a rivet head 45L. The rivet head 45L retains the bearing shaft within the bearing support structure 31L, in a substantially vertical orientation. When so mounted, the shaft supports a roller bearing 33L between an upper spacer 47L and a lower spacer 49L.

The dimensions of the support plates 41L, 43L and the roller bearing 33L are such that the axis of the bearing 33L is offset from the plane of the bent spring 25L in the region of the bearing support structure 311 by an amount less than the radius of the roller bearing 33L. The back of the spring 25L therefore has an opening to allow the bearing to rotate freely without rubbing against the spring 25L similar to that shown in the spring 25R in FIG. 1.

For the left latch spring assembly 3L, the ramp engagement member 35L comprises a short flat extension of the spring 25L toward the distal end of the spring from the vicinity of the bearing support structure 31L. The ramp engagement member 35L includes a pair of bends 61L, 62L which serve to provide an offset between the major plane of the spring 25L and a flat actuator section 63L. The flat actuator section 63L extends from the bend 62L toward the distal end of the spring 25L. The ramp engagement member 35L also includes a section 65R, at the end of the flat section 63L, which is bent back and extends outward at approximately a 450 angle.

In the preferred embodiment, the shuttle assembly 1 is transported from between an initial position and an operative position (cartridge engaged with tape drive) by a moveable conveyor mounted within a housing of the loader mechanism. Other arrangements for moving the shuttle assembly are possible, but the drawings show the structure of the preferred embodiment. A detailed explanation of the structure and operation of the other elements follows, to insure a full and adequate understanding of the preferred embodiment. Additional description of the loader mechanism may also be found in the above-incorporated prior Utility applications.

Figure 2:
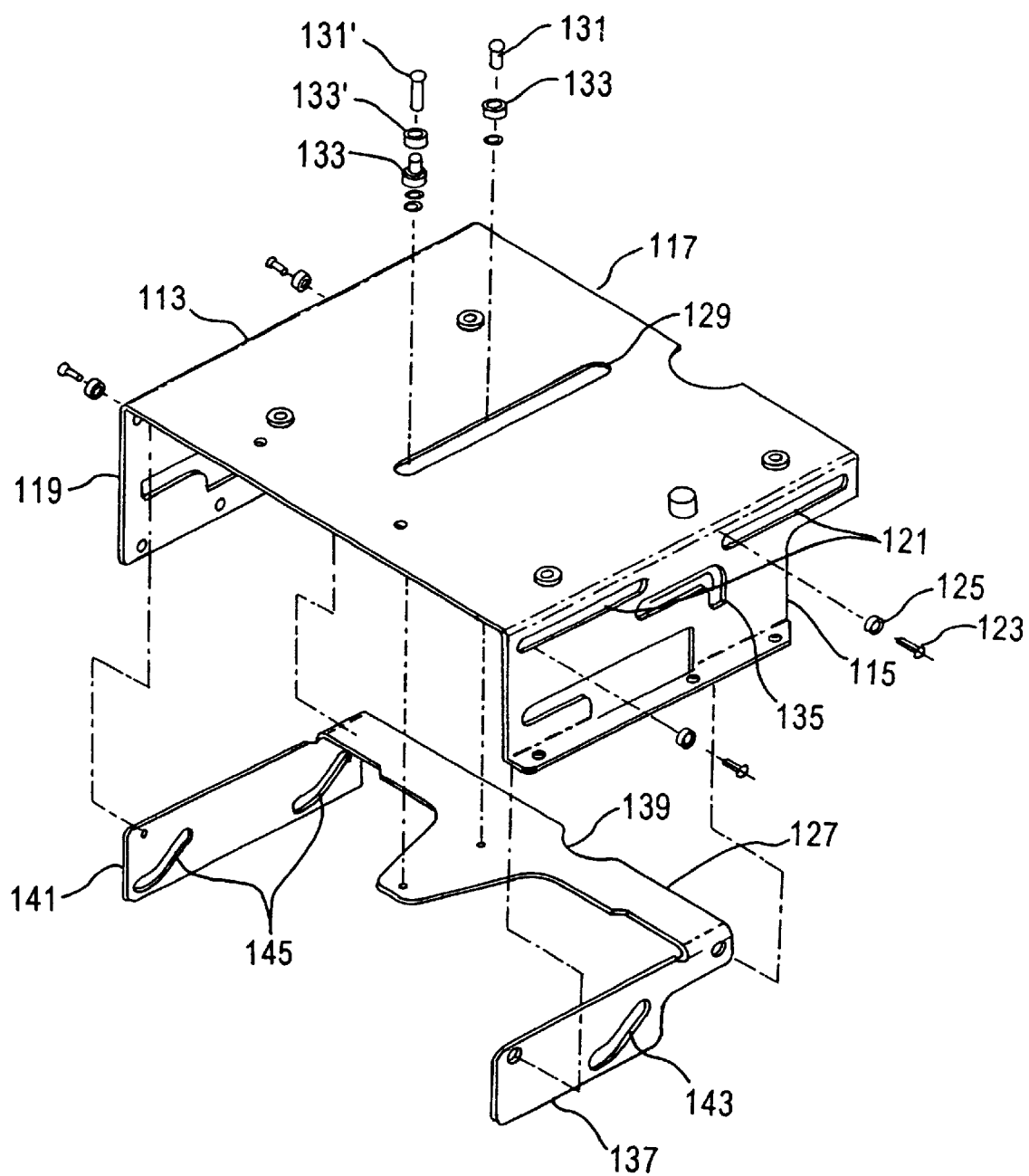
FIG. 2 is an exploded isometric view of a loader assembly housing and the conveyor, useful in explaining the interconnection thereof.

With reference to FIG. 2, the loader assembly frame housing 113 comprises a right sidewall 115, a planar top plate 117 and a left sidewall 119. The sidewalls 115, 119 are substantially perpendicular to the top plate 117. The right sidewall 115 includes a horizontal shoulder at the bottom with two or more holes there through, to facilitate attachment of the sidewall to the top of the base (FIGS. 8 and 9). The left sidewall includes two or more horizontal holes therethrough, to facilitate attachment to the side of the base.

Each sidewall 115, 119 of the loader assembly frame housing 113 includes two linear travel grooves 121. In the illustrated embodiment, the grooves 121 are adjacent to the top of the respective sidewall and extend parallel to the top plate 117. The conveyor includes a cam follower bearing for interaction with each of the linear travel grooves. In the illustrated implementation, these follower bearings comprise machine screws or pins and bearings mounted for rotation about the pins. A pin 123 passes through a bearing 125 and is attached to a hole in the matching sidewall, of the conveyor 127. The bearings 125 are slightly smaller in diameter than the vertical height of the linear travel grooves 121. The linear grooves 121 and the associated cam follower bearings 125 provide vertical support for the conveyor 127. Each of the bearings 125 travels along one of the linear grooves 121, to provide a precise front-to-back linear travel for the conveyor 127.

The top plate 117 of the loader assembly frame housing 113 includes another linear travel groove 129. In the illustrated embodiment, the groove 129 is substantially centered in the top plate 117 between the two sidewalls 115, 119. The groove 129 is somewhat longer than the individual grooves 121. The conveyor 127 includes two cam follower bearings for interaction with the top linear travel groove 129, for example formed by pins 131 and bearings 133. A pin 131 passes through a bearing 133 and is attached to a hole in the matching top plate of the conveyor 127. The bearings 133 are slightly smaller in diameter than the width of the linear travel groove 129. The bearings 133 travel along the linear groove 129 in the top plate 117, to limit lateral movement of the conveyor during front-to-back linear travel of the conveyor 127.

As shown, the front pin 131' actually is somewhat taller than the back pin 131, and the pin 131' passes through two bearings 133, 133'. The lower bearing 133 engages the linear travel groove 129, for control of the front to back motion of the conveyor 127. As discussed more later, the upper bearing 133' forms a cam follower bearing engaging a cam profile within an actuator arm, which induces the movement of the conveyor 127. The back pin 131 and bearing 133 form a path guide bearing.

The sidewall 115 of the frame 113 includes a path constraint groove 135. The groove 135 includes a first linear section extending horizontally (parallel to the top plate 117) in the front-to-back direction along the sidewall. A second linear section, at the back of the groove, extends vertically downward.

The conveyor 127 comprises a right sidewall 137, a top plate 139 and a left sidewall 141. The sidewalls 137, 141 are substantially perpendicular to and extend vertically downward from the top plate 139. The sidewalls of the conveyor 127 include inclined cam profiles 143, 145. Specifically, the right sidewall 137 includes one inclined cam profile 143, approximately mid-way from front to back along the wall, for raising and lowering the cartridge shuttle. The left sidewall 141 includes two cam profiles 145, for use in raising the left side of the cartridge shuttle.

The linear grooves 121, 129 and associated cam follower bearings coupled to the conveyor 127 enable front-to-back and back-to-front linear motion of the conveyor within the loader assembly frame housing 113. The shuttle moves as the conveyor moves. The inclined cam surfaces 143, 145 in the sidewalls 137, 141 of the conveyor 127 produce an additional movement of the cartridge shuttle assembly, specifically in the vertical direction. The cam follower bearing engaging the inclined cam profile 143 also engages the path constraint groove 135 in sidewall 115. The groove 135 controls the direction and extent of travel of the cartridge shuttle during loading and unloading operations.

Figure 3:
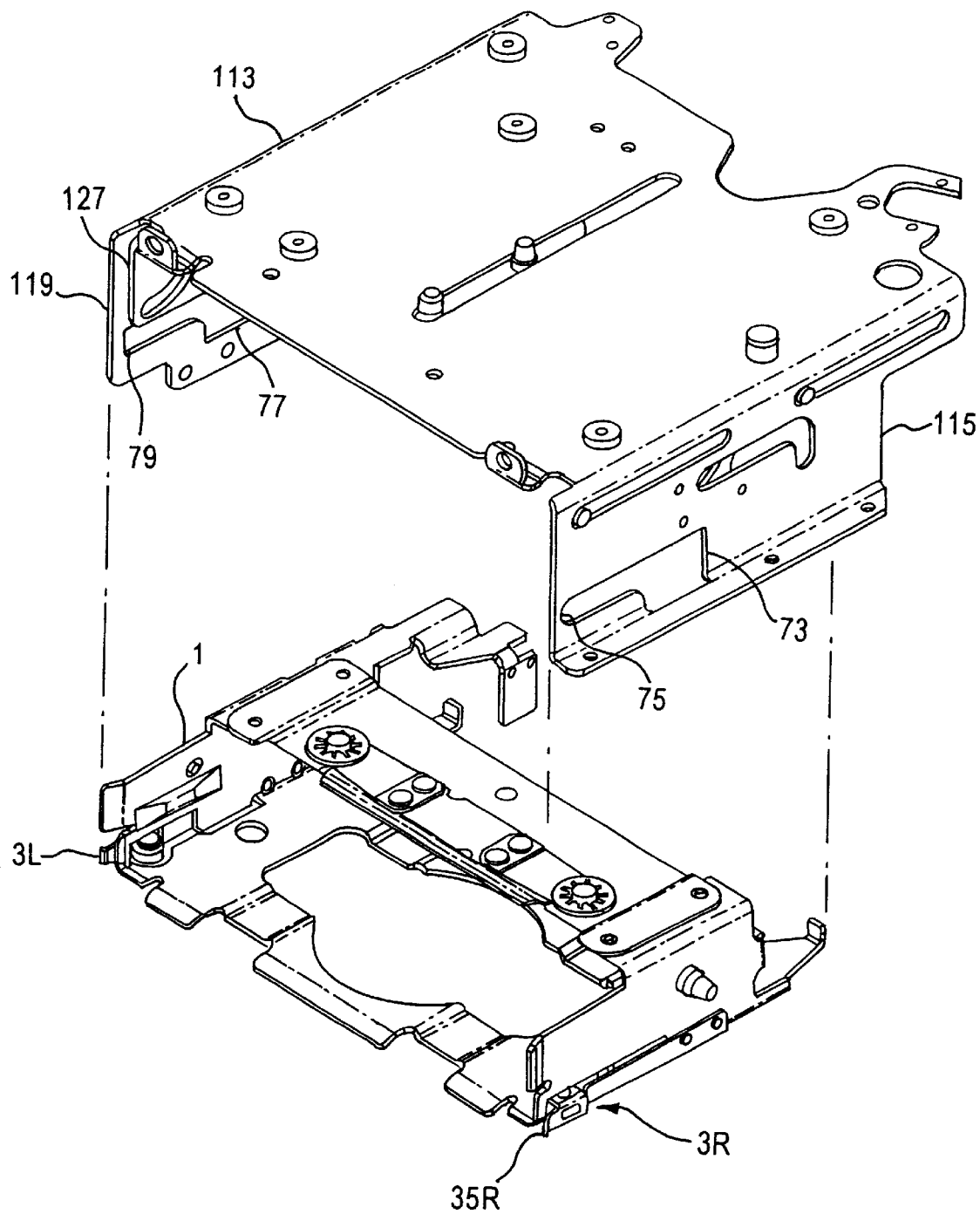
FIG. 3 is an exploded isometric view of a portion of the loader, showing the assembled frame housing and conveyor and separately showing the cartridge shuttle assembly incorporating the inventive cartridge latching spring assemblies.

FIG. 3 shows the conveyor 127 mounted within the frame housing 113, specifically, with the conveyor in its initial position. The drawing is a partially exploded view in that it also depicts the cartridge shuttle assembly 1 not yet mounted within the conveyor 127. However, this drawing does show the latch spring assemblies 3R, 3L mounted to the shuttle assembly 1.

As shown, for example in FIG. 3, the sidewall 115 of the frame housing 113 has an opening 73. The opening 73 includes a substantially horizontal section near the front of the sidewall 115 and a vertical section. The outer portions of the spring assembly 3R move within the opening 73, as the conveyor moves the shuttle assembly 1 back and down during loading and up and forward during unloading. Generally speaking, the opening 73 is dimensioned and contoured for clearance, so that the sidewall 115 will not engage any of the elements of the spring assembly 3R during such movements.

In accord with the invention, however, there is one exception to the clearance requirement. The forward edge 75 of the opening 73 forms a ramp, which serves as the feature to engage and retract the spring. Specifically, the ramp forms an angle or incline that contacts the ramp engagement member 35R when the shuttle assembly returns toward the initial position for insertion and removal of a tape cartridge. The section of the sidewall 115, between the edge 75 and the actual front edge of the sidewall, engages the member 35R and keeps the spring retracted while the shuttle assembly 1 remains in the initial position.

Figure 4:
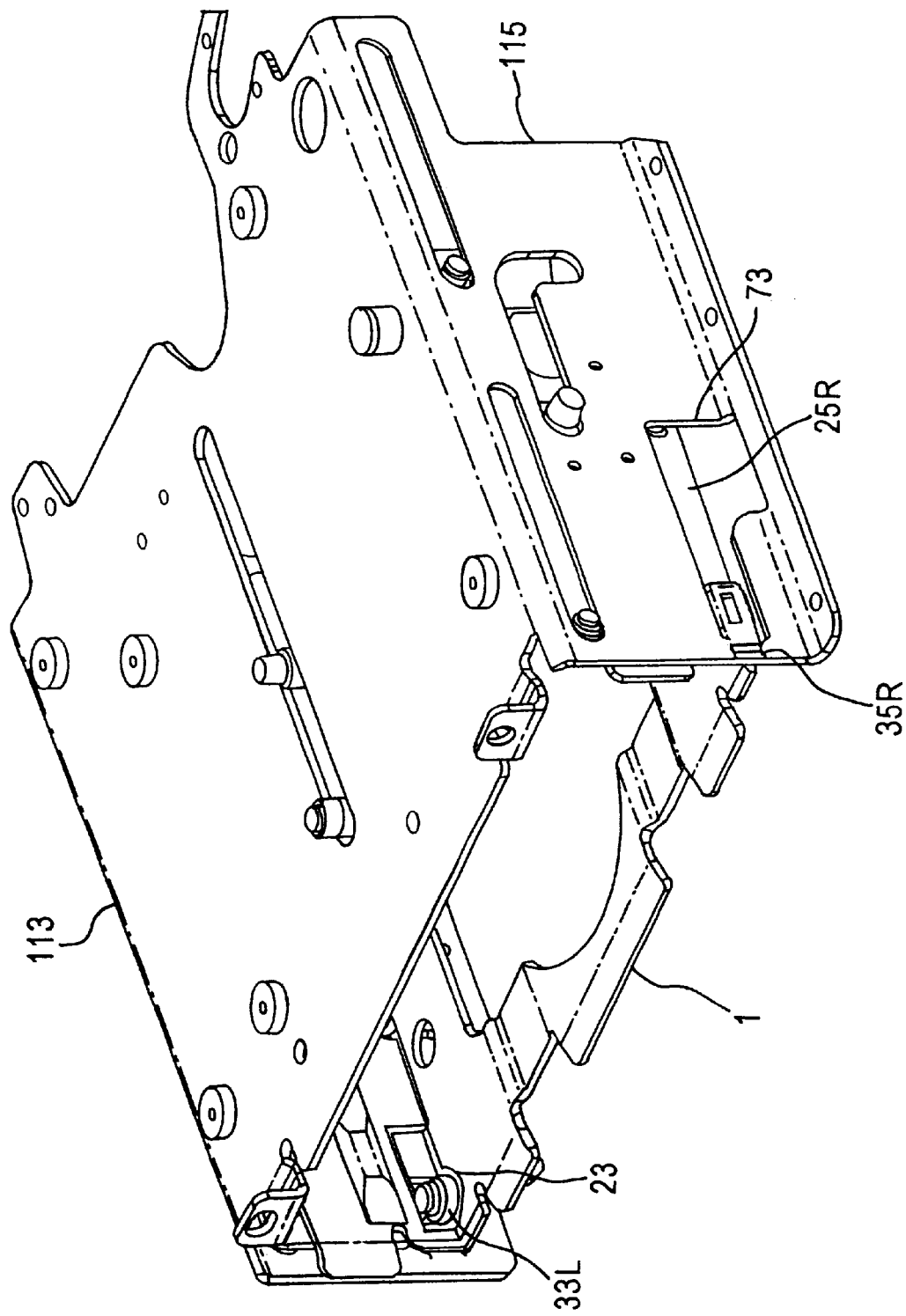
FIG. 4 is an isometric view of the elements of the loader from FIG. 3 shown in the assembled condition, including the inventive cartridge latching spring assemblies engaged by the ramps on the frame housing.

FIG. 4 shows the shuttle 1 assembled within the conveyor and the frame housing 113, with the shuttle 1 and the conveyor 127 in their initial positions awaiting insertion of a tape cartridge. As shown, the right spring assembly 25R is de-rated by the engagement of the member 35R with the portion of the housing between the opening 73 and the front-most edge of the sidewall 115.

Figure 5:
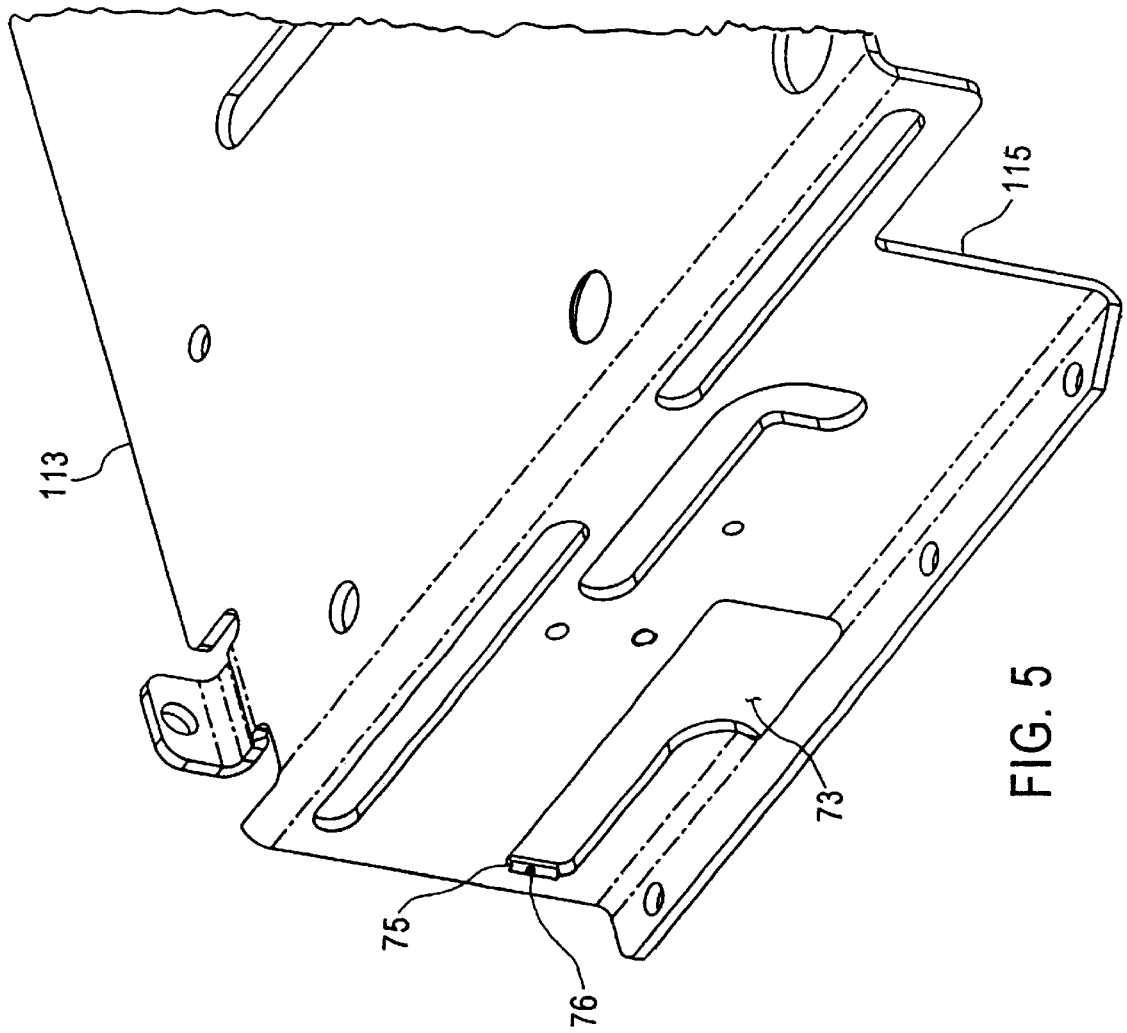
FIG. 5 is an enlarged detail view of one side of the loader frame housing showing one of the latch spring actuation ramps.

FIG. 5 provides a more detailed view of a portion of the frame housing, particularly including the sidewall 115 with the opening 73 there through. As shown, the front edge 75 is beveled to form a ramp 76. The angle of the ramp engages the angled leading edge of the spring formed by the extension 53R of the spring assembly 3R (see FIG. 1-B). Engagement of the ramp causes the member 35R to ride outward or climb onto the outer surface of the sidewall 115, as the conveyor moves the shuttle assembly 1 forward into the initial position for insertion and removal of a tape cartridge.

FIG. 6 provides a bottom view of the shuttle assembly, the conveyor and the frame housing, with a tape cartridge 201 fully inserted into the shuttle assembly but with the shuttle assembly still in its initial position. As such, the right detail view in FIG. 6 shows the right roller 33R in its retracted position (i.e. with the spring force de-rated). However, in this position, the roller bearing does push at least partially into the notch 81 in the lower right edge of the tape cartridge 201.

Returning to FIG. 3, that drawing also shows the sidewall 119 of the frame housing 113 with an opening 77. The opening 77 is substantially similar to the opening 73. Like 73, the opening 77 includes a substantially horizontal section near the front of the respective sidewall 119 and a vertical section. The outer portions of the spring assembly 3L move within the opening 77, as the conveyor moves the shuttle assembly back and down during loading and up and forward during unloading. Generally speaking, the opening 77 is dimensioned and contoured for clearance, so that the sidewall 119 will not engage any of the elements of the spring assembly 3R during such movements.

In accord with the invention, however, there is one exception to the clearance requirement. The forward edge 79 of the opening 77 forms a ramp type retraction feature, similar to the ramp 76 shown in FIG. 5. The ramp formed in the edge 79 contacts the ramp engagement member 35L as the shuttle assembly 1 returns to the initial position, and the portion of the wall between the edge 79 and the front of the sidewall 119 keeps the member 35R in the retracted position while the shuttle remains in its initial position for insertion or removal of a tape cartridge.

FIG. 4 shows the shuttle 1 and the conveyor 127 in their initial positions within the housing 113 awaiting insertion of a tape cartridge. As shown, the roller bearing assembly 33L extends somewhat through the front horizontal portion of the opening 77, albeit in the de-rated position. In the bottom view of FIG. 6, the left detail view shows the left roller 33L in its retracted position with the spring force de-rated. This view also shows the flat section 63L outside the sidewall 119 of the frame housing and the bent section 65L extending further outwards. The passage through and engagement of the sections 63L, 65L with respect to the opening through the sidewall 119 retracts the spring and thereby de-rates the force applied by the spring on the cartridge. However, in this position, the roller bearing does push at least partially into the notch 83 in the lower right edge of the tape cartridge 201.

When the shuttle assembly 1 is in the unloaded position (e.g. FIG. 4), the ends of the engagement members 35R, 35L on the leaf springs 25R, 25L engage the ramps formed on the front edges of the openings 73, 77 on the fixed loader housing walls. As a result, both springs 25 are somewhat retracted, so as to reduce the force applied as the tape cartridge 201 is first slid into the loader or later removed from the loader.

In FIG. 4, the loader mechanism is empty (certain actuator components have been omitted for ease of illustration). The tape loader is in the normal drive orientation awaiting insertion of a tape cartridge. Both the left and right latching springs 25L, 25R are de-rated by resting of the respective distal ends on the ramps formed along the edges of openings of the loader housing 113. When the cartridge 201 is inserted, the front surface of the cartridge engages the roller bearings 33R, 33L on the distal ends of the springs 25R, 25L. Because the springs 25R, 25L are de-rated by the ramps, the spring forces on the cartridge 201 are relatively low, however, there is some force, and the insertion of the cartridge does further deflect the leaf springs outward.

As the cartridge continues to move foreword into the loader mechanism, the sidewalls of the cartridge act on the roller bearings 33R, 33L, causing them to rotate, as the cartridge passes by. The rolling action of the bearings reduces frictional forces on the cartridge walls and eliminates scrapping of the cartridge walls.

After travelling a known distance, the roller bearings 33R, 33L engage positioning notches 81, 83. FIGS. 6-A to 6-C show the notches 81, 83 on the cartridge 201 partially engaged by the roller bearings 33R, 33L on the springs 25R, 25L. As the roller bearings enter the notches, the springs deflect inward toward the center of the cartridge and the mechanism. While the cartridge shuttle is still in its initial position, the ramps and associated sections of the sidewalls limit the inward travel of the springs 25R, 25L.

When the cartridge 201 is in the fully inserted position within the cartridge shuttle, the loader mechanism is activated, for example by the tripping of a sensor switch contacting the front end of the tape cartridge. As discussed more later, an actuator moves the conveyor 127 back away from the opening, and the conveyor causes the shuttle assembly 1 with the cartridge 201 to move back and downward, to engage the actual tape drive elements (see U.S. Pat. No. 6,034,839 re tape drive and see FIG. 9). As the loader starts its loading cycle, the cartridge shuttle assembly 1 moves back from the opening, and as a result, the engagement members 35R, 35L formed on the distal ends of the leaf springs 25R, 25L slide off the ramps. The springs retract further inward, until they fully engage the registration notches 81, 83 and apply full force on the tape cartridge 201. This engagement holds the cartridge securely in the shuttle during loading, until the cartridge engages with alignment pins located on the base of the tape drive. The cartridge is then rigidly located to allow the tape threading mechanism to perform its function. The procedure essentially runs in reverse, to return the cartridge and shuttle to the initial position and de-rate the latching springs 25R, 25L for extraction of the cartridge from the loader.

FIGS. 7-A, 7-B and 7-C show elements for actuating the conveyor and shuttle, and a summary description is given here to insure an adequate understanding of the preferred embodiment of the loader mechanism. Additional information may be found in the above incorporated Utility applications.

FIGS. 7-A to 7-C illustrate the elements of the automatic actuator assembly, for producing the linear back and forth movements of the conveyor 127. FIG. 7-A depicts the loader assembly with the shuttle conveyor actuator arm 221 and the actuator guide 223 mounted on the top of the frame housing 113. The actuator arm 221 includes a bearing opening 225 (FIG. 7-B). The bearing opening 225 is sized slightly larger than the pivot pin 227, securely attached to the top of the frame housing 113 (FIG. 7-B). The pivot pin 227 and opening 225 form a bearing enabling rotational motion of the arm 221 about the axis of the pin and opening. Surrounding regions of the arm include raised bosses.

The actuator arm 221 is a relatively flat member extending from the pivot axis across the top of the frame housing 113. The flat construction of this arm minimizes the vertical space occupied by the means for actuating the conveyor in response to the motive force of the loader motor assembly.

The portion of the periphery around the end of the arm 221 centered about the axis of the pin and opening is semicircular. Along a portion of the semicircular end of the arm 221, the arm includes a series of sector gear teeth 229, at a position stepped-down from the plane of the actuator arm 221. The sector gear teeth extend out radially, to edges that are substantially vertical.

FIG. 7-C presents an isometric view of the loader motor assembly 231. The assembly 231 includes an electromagnetic motor 233, a gear reduction box, an encoder, a gear train and a worm gear 235. The assembly also includes a bracket 237 for securely attaching the assembly 231 to the base (see FIG. 8). The teeth of the worm gear 235 essentially form a screw, which rotates about a horizontal axis. The motor 233, gear reduction box, and gear train drive the worm gear 235 to rotate about its axis. The gear 235 may rotate clockwise or counterclockwise about its axis, depending upon the drive signals applied to the motor 233, to drive the various operations of the loader.

When assembled, the teeth of the worm gear 235 of the motor assembly 231 engage the sector gear teeth 229 on the periphery of the end of the actuator arm 221. The motor assembly 231 rotates the worm gear 235, and the interaction between the teeth of the gear 235 and the teeth of the gear 229 causes the actuator arm 221 to rotate about the pivot axis formed by the pin 227 and the opening 225. Rotation of the worm gear 235 in a first direction will cause the actuator arm 221 to rotate about its axis in a clockwise direction (when viewed from the top as in FIG. 7-A). For example, during a loading operation, this drive operation would move the actuator arm from the position shown in FIG. 7-A to a position around to the right. Later rotation of the worm gear 235 in a second direction will cause the actuator arm 221 to rotate about its axis in a counterclockwise direction to drive the actuator arm back to the position shown in FIG. 7-A, to unload a cartridge.

The actuator guide 223 is mounted on the top plate of the frame housing 113. The front and back ends of the guide 223 include bosses, to support the guide at a distance above the top plate of the housing frame 113. A leading edge of the actuator guide 223 extends to the right, above the path of travel of the distal or radial end of the actuator arm 221. Effectively, the radial end of the actuator arm 221 adjacent the groove 241 travels in the space between the top plate of the frame housing 23 and the guide plate 223. The guide 223 limits any possible upward movement of that end of the arm 221, to prevent twisting of the arm during its movement to load and unload cartridges from the tape drive.

The top surface of the guide 223 is the actual top of the loader mechanism. The actuator arm 221 and the guide 223 provide a particularly low profile and make efficient use of space within the design envelope for the drive.

As shown by the discussion above, the drive motor assembly 231 drives the actuator arm 221 to rotate. The conveyor 127, however, moves in a linear direction along the front-to-back axis of the loader. To convert the rotation of the actuator arm 221 to a linear motion for driving the conveyor 127, the arm 221 includes a curved groove 241. The front and back edges of the groove 241 form cam profiles for cartridge loading and unloading. The groove is wider than the diameter of the associated cam follower bearing, so that when the bearing follows one edge or profile of the groove there is a gap between the bearing and the opposite edge of the groove.

FIG. 7-B shows the cam follower bearing 133' attached to the conveyor, for interaction with the edges of the groove 241. The lower bearing 133 on the front pin and the back bearing 133 interact with the linear travel groove 129, as discussed above relative to FIG. 2. The camming action of the edges of the groove 241 moves the follower bearing 133' back and forth in a linear fashion along the groove 129 in the top plate 117 of the frame housing 113. This motion of the follower 133' in turn induces linear movements of the conveyor 127.

The actuator arm 221 includes a pivot 245, projecting upwards from the upper surface of the arm near one end of the groove 241. The actuator arm 221 also supports a torsion spring 247, which serves as an impact buffer. The coil of the impact buffer spring 247 fits around the outside of the pivot 245. A retainer 249 attaches to the pivot 245 to hold the spring 247 in place. The retainer is a flat member, threaded on the bottom, for attachment to matching threads of the pivot 245. The retainer has flat sides to enable a technician to turn the retainer to attach or detach it from the pivot. This design of the retainer minimizes the height thereof, to keep the loader mechanism within height constraints for the design profile of the drive.

In the preferred embodiments, the bottom, the left and right sides, and the back of the drive 1 are enclosed by a housing (206 shown in FIG. 8). As shown, the housing does not cover the arm 221 and the guide 223 on the top of the loader. The presently preferred housing no longer includes the opening over the arm and the guide.

FIGS. 7-A and 7-B also show the interaction of the home position sensor switch 251 with the cam follower bearing 253 attached to the shuttle assembly. Specifically, the frame housing 113 supports an attached micro-switch 251 near the front end of the horizontal section of the path constraint groove 135 (FIG. 7-B). The home position sensor switch 251 provides a control signal to stop the loader motor operation when it detects the cam follower 253 attached to the shuttle approaching the front end of the groove 135, at the end of an unloading operation.

FIG. 8 shows a fully assembled tape drive system 200 and a tape 201 being inserted therein. A faceplate 203 provides an opening 205 for insertion of the cartridge 201. The system 200 includes a base 209 and a loader assembly 211 constructed in accord with the discussion of FIGS. 1–7 above. The loader assembly 211 receives a tape cartridge, for example containing a magnetic tape or other tape media for storage of digital data. In the presently preferred embodiments, the cartridge is a single-reel tape cartridge 201 containing magnetic tape. The loader assembly 211 loads the cartridge 201 into engagement with a drive motor within the tape drive base 209 and opens a door on the cartridge to provide access to a leader attached to the tape contained within the cartridge.

FIG. 9 shows the tape cartridge 201 in the fully engaged or operative position on the actual digital tape drive 210 constructed on the base 209, albeit with the elements of the loader mechanism removed for ease of illustration and understanding. A load arm assembly connects to the leader and withdraws the leader for coupling to a take up reel. While so engaged, the tape from the cartridge may be repeatedly wound and rewound between the cartridge and the take up reel, while data is read from and/or written to the magnetic tape.

The tape drive system 200 may be loaded manually, or the tape drive system 200 may receive a cartridge 201 from another mechanism, for example from a robotic tape selector in a tape library system. For ease of description, the text herein refers to insertion of a tape by a user. Those skilled in the art will recognize that this "user" may be a human operator or an automated device or system for selecting one of many available tapes, for example in a library of such tapes, and inserting the selected tape through a bezel opening 205 into the tape drive system 200.

It may be helpful to consider the sequence of operations involved in loading a tape cartridge 201 into the tape drive system 200. Initially, a user or an automated mechanism inserts the tape cartridge 201 through a bezel opening 205 into the tape drive 200. Specifically, the cartridge 201 is inserted and pushed toward the back of the cartridge shuttle assembly 1. Extruded features in left sidewall 13 of the shuttle member 5 push the cartridge 201 to the right side of the shuttle assembly. As the cartridge 201 is inserted, the front surface of the cartridge engages the roller bearings 33R, 33L on the distal ends of the springs 25R, 25L. Because the springs 25R, 25L are de-rated by the ramps, the spring forces on the cartridge 201 are relatively low, however, there is some force, and the insertion of the cartridge does further deflect the leaf springs.

As the cartridge 201 moves forward into the shuttle assembly, a bent feature extending inwards from the back of the right sidewall 9 engages the tape-protecting door and slides the door toward the rear of the cartridge. This opens the door, exposing a leader pin attached to the end of the recording tape, making the pin accessible to a grabbing feature in the load arm assembly.

As the cartridge is pushed into the shuttle assembly 1 and approaches its proper location, the latch spring bearings 33L, 33R apply de-rated spring pressure to the cartridge and eventually engage notches 81, 83 in the lower edges of the cartridge 201. The rotation of the bearings does not scrape the sides of the cartridge, and because the spring force is de-rated, the force needed to overcome the springs and fully insert the cartridge 201 is relatively low.

The front of the cartridge 201 eventually engages stops formed at the back of the bottom plate 11 of the shuttle member 5. The cartridge is now in a stable position for transport. The insertion of the cartridge also engages a cartridge-in sensor switch (not shown), which triggers the loader motor assembly 231.

The motor 233, gear reduction box, and gear train drive the worm gear 235 to rotate about its horizontal axis, and the worm gear 235 engages the teeth of the gear 229 to rotate the actuator arm 221 clockwise about the vertical pivot axis formed by the pin 227 and the opening 225 (see FIG. 7-A). As the actuator arm 221 rotates, the front edge of groove 241 makes normal contact (90° pressure angle) with the follower bearing 133' attached to the top of the cartridge conveyor 127. The rotational movement of the arm 221 therefore produces a linear movement of the conveyor 127 back into the tape drive.

The linear motion of the conveyor 127 initially induces a linear motion of the tape cartridge shuttle assembly 1 along the path constraint groove 135 in the frame housing 113. As cartridge shuttle assembly 1 moves back from the opening 205, the engagement members 35R, 35L formed on the distal ends of the leaf springs 25R, 25L slide off the ramps. The springs retract inward and apply the full force of the respective springs 25R, 25L. The roller bearings 33R, 33L fully engage the registration notches 81, 83 on the tape cartridge 201. This engagement holds the cartridge securely in the shuttle during the further loading motions.

Once the cam follower bearing attached to the tape cartridge shuttle 1 reaches the end of the horizontal portion of the groove 135, the inclined cam profiles 143, 145 formed in the side plates of the conveyor 127 induce a downward vertical movement of the tape cartridge shuttle assembly 1. As the shuttle assembly 1 lowers the cartridge 201, features on the base engage holes in the bottom of the cartridge, to accurately align the tape cartridge in its lowermost position essentially as shown in FIG. 9.

A motor-driven gear in the tape drive engages a gear coupled to the reel within the cartridge 201. After this lowering of the shuttle assembly 1 and the cartridge 201 to the operative position, the loader motor assembly 231 stops, and the movement of the actuator arm 221, the conveyor 127 and the shuttle assembly 1 stops. The tape cartridge 201 is in the fully loaded position. The leader pin attached to the end of the magnetic tape within the cartridge is accessible through the open tape door. A grabbing feature of the load arm assembly grabs the leader pin and draws the pin to the center of the take-up reel (see FIG. 9). The data read/write process may now commence.

It also may be helpful to consider the sequence of operations involved in unloading a tape cartridge from the tape drive 1. A control signal causes the tape drive motor to rewind the tape into the cartridge 201, and the leader pin is released from the take-up reel and the load arm assembly. A control signal is then applied to the loader motor assembly 231. This signal causes the motor 233, gear reduction box, and gear train drive the worm gear 235 to rotate in the opposite direction about its horizontal axis.

The worm gear 235 engages the teeth of the gear 229 to now rotate the actuator arm 221 counterclockwise about the vertical pivot axis formed by the pin 227 and the opening 225 (FIG. 7-A). As the actuator arm 121 rotates, the back edge of groove 241 makes normal contact (90° pressure angle) with the follower bearing 133' attached to the top of the cartridge conveyor 127 (FIG. 4-B). This rotational movement of the arm 221 therefore produces a linear movement of the conveyor 127 from the back of the tape drive 1 toward the front of the drive.

The forward linear motion of the conveyor 27 causes the trailing edges of the grooves 143, 145 to engage the respective follower bearings on the shuttle assembly to lift the shuttle assembly 1 and the cartridge 201 off of the actual tape drive base. Still further movement of the conveyor then moves the shuttle assembly 1 and the cartridge 201 laterally back toward the bezel opening 205 as constrained by the groove 135.

As the movement of the conveyor 127 moves the cartridge shuttle assembly 1 back toward the initial position, the leading bent edges 53R and 65L of the engagement members 35R, 35L contact the ramps formed on the front edges of the openings 73, 77 in the frame housing sidewalls. The ramps retract the distal ends of the springs 25R, 25L as the engagement members 35R, 35L slide out and then over the respective sections of the sidewalls 9, 11. As the springs retract, the roller bearings do not fully engage the notches 81, 83, although the peripheries of the rollers do remain somewhat within the notches.

When the conveyor 127 and the shuttle assembly 1 reach the end of their range of travel toward the front of the drive, the cam follower 253 trips the home position switch 251, and operation of the motor 233 stops. At this point, the motion of the actuator arm 221, the conveyor 127 and the shuttle assembly 1 stop, and the cartridge 201 is accessible through the bezel opening 205 so as to allow a user or a mechanism to withdraw the cartridge. As the cartridge is withdrawn, the springs 25R, 25L apply some resistive force through the roller bearings 33R, 33L to the sides of the cartridge. However, this force is relatively low, since the springs are now derated by engagement with the ramps formed in the sidewalls of the housing.

As shown by the drawings and the above discussion, the automatic tape cartridge loader mechanism of the present invention provides an effective system for loading and unloading cartridges, while minimizing the space occupied by the loader. The loader illustrated in the drawings is only slightly larger than the tape cartridge itself. The improved latching mechanism takes-up minimal space within the design envelope yet provides an optimum registration and latching system. Forces on the cartridge are minimized during insertion and removal, and the use of roller bearings eliminates scraping of cartridge surfaces, which might otherwise generate harmful debris. Relatively high registration forces are applied to the notches during movement, to securely hold the cartridge in the shuttle assembly.

Those skilled in the art will recognize that the present invention has a broad range of applications, and the embodiments admit of a wide range of modifications, without departure from the inventive concepts. For example, the illustrated embodiment in a relatively small loader with a two-dimensional soft loading function utilized leaf springs, to provide desired forces yet remain within the tight design envelope space. Other types of loader mechanisms may require similar registration functions but may utilize other types of springs. If the spring takes a form other than a leaf spring, the registration device likewise may take other forms. For example, if a coil spring is used, the registration device may be a piston or a pivotal arm coupled to the coil spring.

While the foregoing has described what are considered to be the best mode and/or other preferred embodiments of the invention, it is understood that various modifications may be made therein and that the invention may be implemented in various forms and embodiments, and that it may be applied in numerous applications, only some of which have been described herein. It is intended by the following claims to claim any and all modifications and variations that fall within the true scope of the inventive concepts.

What is claimed is:

1. A tape cartridge latching mechanism, for an automatic tape cartridge loader, the tape cartridge loader comprising a moveable cartridge shuttle for receiving a cartridge in an initial position and moving the cartridge between the initial position and an operative position in which the cartridge is engaged with a digital tape drive, the tape cartridge latching mechanism, comprising:

a spring attached to the cartridge shuttle;

a registration device coupled to the spring for engaging a registration notch on the tape cartridge with an inward force applied by the spring; and a feature fixed at a location within the loader, the fixed feature being adapted to engage a portion of the spring when the cartridge shuttle is in the initial position to retract the portion of the spring outward and thereby de-rate the inward force applied by the spring during insertion and removal of the tape cartridge and to not engage the portion of the spring when the cartridge shuttle is away from the initial position.

2. A tape cartridge latching mechanism as in claim 1, wherein the registration device comprises a roller mounted on the spring for rolling engagement with a surface of the tape cartridge during insertion and removal of the tape cartridge.

3. A tape cartridge latching mechanism as in claim 1, wherein:

the spring comprises a leaf spring and an integral mounting structure; and the registration device comprises a roller bearing attached to the spring by the integral mounting structure.

4. A tape cartridge latching mechanism as in claim 1, further comprising:

another spring attached to the cartridge shuttle;

another registration device coupled to said another spring for engaging another registration notch on the tape cartridge with an inward force applied by said another spring; and another feature fixed at a location within the loader, said another fixed feature being adapted to engage a portion of said another spring when the cartridge shuttle is in the initial position to retract the portion of said another spring outward and thereby de-rate the inward force applied by said another spring during insertion and removal of the tape cartridge and to not engage the portion of said another spring when the cartridge shuttle is away from the initial position.

5. A tape cartridge latching mechanism, for an automatic tape cartridge loader the tape cartridge loader comprising a moveable cartridge shuttle for receiving a cartridge in an initial position and moving the cartridge between the initial position and an operative position in which the cartridge is engaged with a digital tape drive, the tape cartridge latching mechanism, comprising:

a spring attached to the cartridge shuttle:

a registration device coupled to the spring for engaging a registration notch on the tape cartridge with a force applied by the spring; and a feature fixed at a location within the loader, the fixed feature being adapted to engage a portion of the spring when the cartridge shuttle is in the initial position to retract the spring and thereby de-rate the force applied by the spring during insertion and removal of the tape cartridge and to not engage the portion of the spring when the cartridge shuttle is away from the initial position, wherein:

the spring comprises a leaf spring attached to a sidewall of the cartridge shuttle;

the feature comprises a ramp formed on a sidewall of a frame housing of the loader; and the portion of the spring comprises a ramp engagement member formed as an extension of the leaf spring at the distal end of the leaf spring.

6. A tape cartridge latching mechanism, for an automatic tape cartridge loader, the tape cartridge loader comprising a moveable cartridge shuttle for receiving a cartridge in an initial position and moving the cartridge between the initial position and an operative position in which the cartridge is engaged with a digital tape drive, the tape cartridge latching mechanism, comprising:

a spring attached to the cartridge shuttle;

a registration device coupled to the spring for engaging a registration notch on the tape cartridge with a force applied by the spring;

a feature fixed at a location within the loader, the fixed feature being adapted to engage a portion of the spring when the cartridge shuttle is in the initial position to retract the spring and thereby de-rate the force applied by the spring during insertion and removal of the tape cartridge and to not engage the portion of the spring when the cartridge shuttle is away from the initial position;

another sprint attached to the cartridge shuttle;

another registration device coupled to said another spring for engaging another registration notch on the tape cartridge with a force applied by said another spring; and another feature fixed at a location within the loader, said another fixed feature being adapted to engage a portion of said another sprint when the cartridge shuttle is in the initial position to retract said another spring and thereby de-rate the force applied by said another spring during insertion and removal of the tape cartridge and to not engage the portion of said another spring when the cartridge shuttle is away from the initial position, wherein:

each spring comprises a leaf spring attached to a respective wall of the cartridge shuttle;

each feature comprises a ramp formed on a wall of a frame housing of the loader; and each portion comprises a ramp engagement member formed as an extension of a respective one of the leaf springs at the distal end of the respective leaf spring.

7. A tape cartridge latching mechanism as in claim 6, wherein each registration device comprises a roller mounted on a respective one of the leaf springs for rolling engagement with a surface of the tape cartridge during insertion and removal of the tape cartridge.

8. An automatic tape cartridge loader for loading a tape cartridge to and from engagement with a digital tape drive for reading data from or writing data to a tape contained in the cartridge, the loader comprising:

a frame housing;

a cartridge shuttle mounted within the frame housing for movement, between an initial position in which the tape cartridge may be inserted or removed and a loaded position in which the cartridge within the shuttle is engaged with the digital tape drive;

a drive motor coupled to the cartridge shuttle for automatically moving the cartridge shuttle between the initial position and the loaded position;

a leaf spring having a proximal end attached to the cartridge shuttle;

a registration device, supported by the leaf spring near a distal end of the leaf spring, for engaging a registration notch on the tape cartridge;

an actuation member at the distal end of the leaf spring; and a feature at a fixed location on the frame housing, adapted to engage the actuation member when the cartridge shuttle is in the initial position so as to retract the distal end of the leaf spring outward and thereby de-rate a an inward force applied by the leaf spring through the registration device to the cartridge during insertion and removal of the tape cartridge and to not engage the actuation member when the cartridge shuttle is away from the initial position.

9. An automatic tape cartridge loader as in claim 8, wherein the actuation member comprises an angled extension of the leaf spring at the distal end of the leaf spring.

10. An automatic tape cartridge loader as in claim 8, wherein the registration device comprises a roller bearing.

11. An automatic tape cartridge loader as in claim 10, wherein the leaf spring comprises an integral mounting structure supporting the roller bearing on the leaf spring in such a manner that the roller bearing is rotatable in response to engagement by a surface of the tape cartridge during insertion and removal of the tape cartridge.

12. An automatic tape cartridge loader as in claim 8, further comprising:
   another leaf spring having a proximal end attached to the cartridge shuttle;
   another registration device, supported by said another leaf spring near a distal end of said another leaf spring, for engaging another registration notch on the tape cartridge;
   another actuation member at the distal end of said another leaf spring; and
   another feature at a fixed location on the frame housing, adapted to engage said another actuation member when the cartridge shuttle is in the initial position so as to retract the distal end of said another leaf spring the distal end of outward and thereby de-rate a an inward force applied by said another leaf spring through said another registration device to the cartridge during insertion and removal of the tape cartridge and to not engage said another actuation member when the cartridge shuttle is away from the initial position.

13. An automatic tape cartridge loader as in claim 12, wherein each registration device comprises a roller for engagement with the tape cartridge.

14. An automatic tape cartridge loader as in claim 8, further comprising:
   a conveyor mounted for linear movement within the frame housing;
   a cam and follower arrangement for mounting the cartridge shuttle within the conveyor in such a manner that the linear movement of the conveyor causes a bi-directional movement of the cartridge shuttle within the frame housing.

15. An automatic tape cartridge loader as in claim 14, further comprising:
   an actuator arm driven to rotate in response to operation of the drive motor; and
   a coupling of the actuator arm to the conveyor, such that rotation of the actuator arm in response to operation of the drive motor produces the linear movement of the conveyor and through the conveyor causes the bi-directional movement of the cartridge shuttle.

16. An automatic tape cartridge loader for loading a tape cartridge to and from engagement with a digital tape drive for reading data from or writing data to a tape contained in the cartridge the loader comprising:
   a frame housing;
   a cartridge shuttle mounted within the frame housing for movement, between an initial position in which the tape cartridge may be inserted or removed and a loaded position in which the cartridge within the shuttle is engaged with the digital tape drive;
   a drive motor coupled to the cartridge shuttle for automatically moving the cartridge shuttle between the initial position and the loaded position;
   a leaf spring having a proximal end attached to the cartridge shuttle;
   a registration device, supported by the leaf spring near a distal end of the leaf spring, for engaging a registration notch on the tape cartridge;
   an actuation member at the distal end of the leaf spring; and
   a feature at a fixed location on the frame housing, adapted to engage the actuation member when the cartridge shuttle is in the initial position so as to retract the leaf spring and thereby de-rate a force applied by the leaf spring through the registration device to the cartridge during insertion and removal of the tape cartridge and to not engage the actuation member when the cartridge shuttle is away from the initial position, wherein:
      the actuation member comprises an angled extension of the leaf spring at the distal end of the leaf spring, and
      the feature comprises a ramp formed in a sidewall of the frame housing, located and oriented so as to engage the angled extension of the leaf spring as the cartridge shuttle returns to the initial position.

* * * * *